United States Patent [19]
Boyce et al.

[11] Patent Number: 5,988,364
[45] Date of Patent: Nov. 23, 1999

[54] QUICK CONNECT/DISCONNECT DEVICE

[75] Inventors: Keith W. Boyce, Philadelphia; Kelly J. Rawley, King of Prussia, both of Pa.

[73] Assignee: R. W. Hartnell Company, Philadelphia, Pa.

[21] Appl. No.: 08/787,468

[22] Filed: Jan. 22, 1997

[51] Int. Cl.$^6$ ................................................. B65G 35/00
[52] U.S. Cl. .............................. 198/867.15; 198/867.11; 198/867.12; 292/252; 24/453; 411/348
[58] Field of Search ......................... 198/387.01, 397.02, 198/397.03, 397.04, 867.11, 867.12, 867.15, 803.2, 711, 712, 867.01, 867.02; 292/252, 9; 24/453; 411/348

[56] References Cited

U.S. PATENT DOCUMENTS

| | | |
|---|---|---|
| 1,385,000 | 7/1921 | Griffing . |
| 2,373,083 | 4/1945 | Brewster ................................ 411/348 |
| 2,515,807 | 7/1950 | Spooner .................................. 411/348 |
| 2,859,689 | 11/1958 | Ackley . |
| 2,931,292 | 4/1960 | Ackley . |
| 3,084,781 | 4/1963 | Merrill . |
| 3,085,462 | 4/1963 | Myers ..................................... 411/348 |
| 3,170,362 | 2/1965 | Mewse .................................... 411/348 |
| 3,180,390 | 4/1965 | Ockert, Jr. .............................. 411/348 |
| 3,183,586 | 5/1965 | Sellers ..................................... 29/441.1 |
| 3,233,496 | 2/1966 | De Pew et al. .......................... 411/348 |
| 3,272,118 | 9/1966 | Ackley . |
| 3,498,653 | 3/1970 | McCreery . |
| 3,670,865 | 6/1972 | Garland . |
| 3,696,744 | 10/1972 | Etchell .................................. 101/415.1 |
| 3,789,575 | 2/1974 | Bross . |
| 3,838,766 | 10/1974 | Wagers, Jr. et al. . |
| 3,889,591 | 6/1975 | Noguchi . |
| 3,933,239 | 1/1976 | Yoshida . |
| 4,111,477 | 9/1978 | Rigali ..................................... 292/252 |
| 4,126,219 | 11/1978 | Bross . |
| 4,135,418 | 1/1979 | McCray et al. ......................... 82/36 A |
| 4,189,996 | 2/1980 | Ackley, Sr. et al. . |
| 4,308,942 | 1/1982 | Ackley . |
| 4,369,702 | 1/1983 | Ackley . |
| 4,377,971 | 3/1983 | Ackley . |
| 4,413,556 | 11/1983 | Ackley . |
| 4,483,639 | 11/1984 | McCandless, II ....................... 403/317 |
| 4,632,028 | 12/1986 | Ackley . |
| 4,657,130 | 4/1987 | Ackley, Jr. et al. . |
| 4,905,589 | 3/1990 | Ackley . |
| 4,932,295 | 6/1990 | Erickson . |
| 5,207,544 | 5/1993 | Yamamoto et al. .................... 411/348 |
| 5,261,522 | 11/1993 | Guttinger et al. ...................... 198/429 |
| 5,433,146 | 7/1995 | Ackley . |
| 5,494,323 | 2/1996 | Huang .................................... 292/252 |

*Primary Examiner*—Christopher P. Ellis
*Assistant Examiner*—Steven B. McAllister
*Attorney, Agent, or Firm*—Synnestvedt & Lechner LLP

[57] ABSTRACT

A quick connect/disconnect device and method for manually demountably attaching carrier bars to an endless train comprising a conveyor adapted for conveying pellet-like items in a pellet marking machine is disclosed. The device comprises an elongated shank with an enlarged head and a central bore coaxial therethrough. Radially oriented passages disposed adjacent to the end of the shank opposite the head house balls which extend outwardly beyond the outer surface of the shank when a plunger within the central bore is biased to its normal position. Moving the plunger against its biasing spring allows the balls to retract partially within the central bore, allowing the shank to be inserted into mounting holes in the carrier bar and receiving holes in the endless train. When mounted on the train the carrier bar and endless train are sandwiched between the enlarged head and the extended balls, the carrier bar being retained to the endless train thereby.

22 Claims, 5 Drawing Sheets

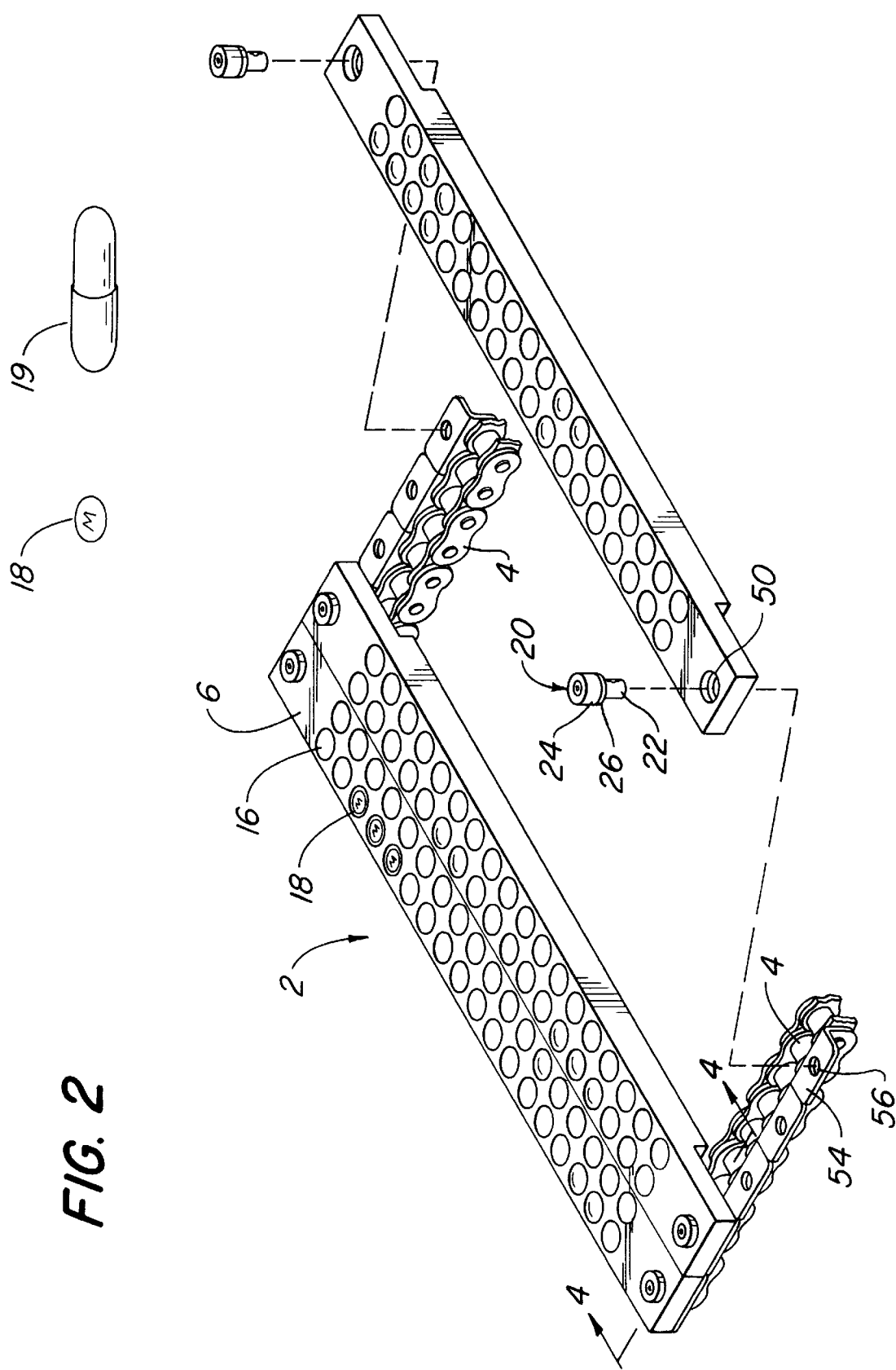

QUICK CONNECT/DISCONNECT DEVICE

FIELD OF THE INVENTION

This invention relates to a quick connect/disconnect device for use with machines which receive, orient, convey, and imprint an intelligence on a series of pellet-like items, the machines having a conveyor comprising carrier bars demountably attached to an endless chain or belt, the conveyor being adapted for conveying the pellet-like items.

BACKGROUND OF THE INVENTION

In the manufacture of many pharmaceutical products such as pills or lozenges, candies such as "M&M's", small mechanical parts such as ball bearings, or electrical components such as resistors or capacitors, it is often desirable to imprint a trademark, indicia, or other information or intelligence on each item. These products share a common characteristic in that they are all pellet-like, being small, often round or rounded, oval, bulbous, cylindrical, or polygonal in shape. Examples of pellet-like items are pills, lozenges, capsules, tablets and caplets.

Imprinting indicia on a series of pellet-like items is conveniently accomplished by a machine which receives a large number of items in bulk, typically from a feed hopper or bin, orients the items to a uniform relative orientation, conveys the oriented items to a printing unit wherein the indicia are applied to each item and discharges the items for subsequent packaging. U.S. Pat. No. 2,859,689 to Ackley is a typical example of a pellet marking machine which performs the steps outlined above. Pellet-like items, seen in FIG. 2 of the '689 patent, designated "P", are loaded in bulk into the feed hopper 22 where the items are received by a rotating drum or cylinder roll 23. The drum has a multiplicity of concavities or recesses 33 in its outwardly facing surface formed in accordance with the shape and size of the pellet-like items being processed. The items P are received into the concavities 33 as the drum rotates clockwise beneath hopper 22, retained in the concavities by cylindrical retainer surface 50 as the drum rotates and released to an endless conveyor 24 located beneath the drum, the conveyor having a multiplicity of individual carrier bars 110. Carrier bars 110 have corresponding concavities matching the concavities 33 in drum 23, and conveyor 24 is synchronized with drum 23 so that the matching concavities on the drum and the conveyor line up as the drum rotates clockwise and the conveyor circulates counterclockwise. Items P drop from concavities 33 in drum 23 into the matching concavities in the endless conveyor 24 once the items are clear of retaining surface 50. The pellet-like items P are then conveyed to a printing roller 27 which has ink laden images of the indicia or intelligence to be imprinted on the items circumferentially arrayed on its peripheral surface. Printing roller 27 rotates clockwise in synchronization with endless conveyor 24 and contacts the pellet-like items P as they pass beneath the printing roller 27, applying the ink laden image to each pellet-like item. After passing beneath printing roller 27 the pellet-like items P are discharged from conveyor 24 as the conveyor rounds its drive sprocket and the carrier bars 110 are momentarily vertically oriented.

Although machines similar to that described in the '689 patent provide an effective means for reliably and rapidly marking pellet-like items with indicia, the machines lack a certain versatility in that such machines cannot readily be converted for processing different types of pellet-like items. In the recent past, pellet marking machine versatility was not a concern because there were a relatively limited number of pellet shapes and sizes in the marketplace and manufacturers by and large were satisfied with a dedicated machine for a particular product line. However, as the various industries, most notably pharmaceuticals, evolved over time, pellet marking machine versatility became more important. To remain competitive in the marketplace, pellet marking machines have been forced to evolve to keep up with the faster pace of technological change in product development, encapsulation methods, marking methods and packaging requirements, in addition to meeting the needs for greater efficiency and lower cost imposed by the highly competitive markets. In this context pellet marking machine versatility, as evidenced by the ability to process different types of pellet-like items, has come to the fore as the desirable characteristic which makes one pellet marking machine superior to another among the various industrial customers.

The lack of versatility of pellet marking machines as described in the '689 patent is in great part attributable to the means and the method by which the carrier bars are attached to the endless chain in forming the conveyor. If a pellet marking machine is to process different pellet-like items, the carrier bars must be easily interchangeable because the concavities in the carrier bars must be specifically matched in size and shape to the particular pellet-like item being processed. Matching the concavity to the item is important for efficient processing of the items by the machine. Items which are too large for their receiving concavities may tend to dislodge from the carrier bars due to machine vibration during operation. Such items will roll loose and uncontrolled on the conveyor and will not be arranged in the proper relation when passing beneath the printing roller to receive the imprinted intelligence. The items could be crushed between the printing roller and the conveyor and foul moving parts of the machine, perhaps causing a stoppage of the machine altogether. Items which are too small or the wrong shape for their concavities will not be reliably and consistently positioned on the conveyor. Items which are not consistently positioned and held within the concavities of the carrier bar will not have the indicia printed in a consistent, desired location during the imprinting step, resulting in unacceptable product. Items which lodge too deeply within a concavity may only receive a partial imprint of the indicia or intelligence, or may receive no imprint at all. Thus carrier bars with concavities ill matched to the pellet-like items will cause inefficient machine operation and costly product wastage.

If a machine is to be capable of processing many different types of pellet-like items, the ability to rapidly and easily replace the carrier bars suited for one item with carrier bars having concavities matched to a different item is important. Currently, in machines such as described in the '689 patent, the carrier bars 110 are bolted to link members 112 of the endless chain, as shown in FIGS. 7 and 8 of the '689 patent. Two or more bolts are used for each of scores of carrier bars. Bolting of carrier bars to the endless chain has traditionally been the only means used to attach the carrier bars. The use of bolts provides a means for adjusting the alignment of the carrier bars within the machine. Alignment of the carrier bars is important, as for any moving part on the machine, to ensure quiet, precision operation of the machine avoiding unwanted vibration and damaging contact with other moving or stationary parts. Thus to convert a machine from processing one item type to another requires that a technician unbolt each carrier bar from the endless chain, remove each carrier bar, replace each carrier bar with a different carrier bar, align each carrier bar within a given positional tolerance to travel over the conveyor path without impinging on other machine components, torque each mounting bolt to a desired level, and adjust the final alignment as required once the carrier bars are completely replaced. This process is tedious and time consuming, resulting in significant machine down time and consequent adverse effects on production efficiency during the change over. The process can also entail some risk to the technician, if for example, a nut is used to retain the bolt; then the technician must place his hand within the machine, often between moving and stationary parts, to thread the nut onto the bolt and hold the nut stationary with a tool, such as a wrench, when the bolt is torqued down. Accidental starting of the conveyor in this situation can have predictable calamitous results. Furthermore, the small retainer nuts could be dropped into the machine where they might lodge in gear teeth or other moving parts, jamming the machine.

An alternative method of changing the carrier bars is available whereby only the carrier bar over the master link of the endless chain is removed, and then the master link of each chain run is disengaged, opening the conveyor and allowing it to be removed from the machine as a complete unit. Although this method proceeds more quickly than the interchange method described above, the alternative method suffers from several distinct disadvantages. First, conveyor assemblies comprised of several hundred carrier bars and their associated conveyor chains are very heavy and require at least two technicians to lift from or lower into the machine. Second, such complete conveyor assemblies are unwieldly and therefore difficult to remove from or mount onto the machine. Third, complete conveyor assemblies are bulky and thus difficult to transport and store when not in use. Fourth, such assemblies tend to lose their alignment relative to the machine when removed and man-handled, and must be realigned when installed in a machine. Fifth, the alternative method is inapplicable if an endless belt is used instead of the endless chain.

Clearly, there is a need for improvement of the means and method by which carrier bars are attached and aligned within the pellet marking machine providing increased machine versatility, improved carrier bar alignment, safer machine maintenance methods, and more efficient machine operation and utilization.

SUMMARY AND OBJECTS OF THE INVENTION

With the quick connect/disconnect device and method according to the invention, carrier bars can be rapidly and easily changed manually on a conveyor in a pellet marking machine. The invention further allows a technician to effect the change over with a minimum of tools and risk of injury. Furthermore, the carrier bars are self aligning when the quick connect/disconnect device is used to retain the carrier bars to an endless chain or belt, thus obviating the need for the technician to precisely align each carrier bar, as will be explained in detail later.

The quick connect/disconnect device comprises an elongated shank having an enlarged head and a central bore through both the head and the shank. The central bore is divided roughly in half by a radially oriented annular shoulder extending into the bore and reducing its diameter. The shank outer diameter is dimensioned to interfit tightly within a mounting aperture within the carrier bar and a receiving aperture on the endless chain or belt to very close tolerances.

One or more passages oriented radially within the shank communicate between the bore and the outer surface of the shank. The passages are located adjacent to the end of the shank opposite the enlarged head. Each passage contains a ball having a diameter smaller than the diameter of the passage, but larger than the length of the passage from the central bore to the shank outer surface. Each ball is retained at one end of its passage by staking the end of the passage at the outer surface of the shank, and at the other end of the passage by the presence of a plunger located within the central bore, described below. Each ball is thus permitted limited movement within a respective passage between the staked end of the passage and the central bore.

The plunger is slidably located within the central bore. The plunger is essentially an elongated member comprising a segment having a relatively larger diameter, a tapering segment, and a segment of relatively smaller diameter. The larger diameter plunger segment substantially fills the entire diameter of the central bore, and is normally positioned within the central bore adjacent to the radially oriented passages. The larger diameter plunger segment impinges upon and displaces the balls outwardly from the central bore and into their respective passages, causing a portion of each ball to extend beyond the outer surface of the shank. The tapering plunger segment normally impinges on the annular shoulder, preventing the plunger from passing completely through the bore. The plunger segment of smaller diameter is sized to pass through the reduced bore diameter of the annular shoulder and extends within the bore from the annular shoulder to a point adjacent to the enlarged head. A biasing means, typically a coil spring, is located coaxially within the bore around the smaller diameter segment of the plunger. A spring retaining cap is mounted on the smaller diameter plunger segment within the bore adjacent to the enlarged head and the spring is trapped between the annular shoulder and the retaining cap, biasing the plunger's tapering segment against the annular shoulder and positioning the larger diameter plunger segment adjacent to the radial passages as described above. The retaining cap lies exposed at the end of the central bore, and pressure applied to the cap will cause the plunger to slide within the central bore against the biasing spring. Sliding motion of the plunger causes the larger diameter segment to move out of alignment with the radial passages, bringing the smaller diameter segment of the plunger adjacent to the passage. The balls are free to move inwardly, withdrawing or retracting through the passage and into the central bore, but being retained partially within the passages by the presence of the smaller diameter plunger segment. When pressure on the retaining cap is released the biasing spring returns the plunger to its preferred position, and the tapering plunger segment engages the curved surfaces of the balls, initially displacing the balls from the central bore into their respective passages. As the plunger moves further back to its biased position the larger diameter plunger segment impinges on the balls, forcing them deeper into the passages and causing them to extend partially beyond the outer surface of the shank.

An O-ring seal is positioned circumferentially around the shank adjacent to the enlarged head, and serves to compressively preload the carrier bar against the endless chain or belt, as described in detail below.

The endless conveyor typical of pellet marking machines comprises a multiplicity of carrier bars demountably attached to and transported by a pair of endless trains circulating over a closed loop or circuit. An endless train pair could comprise a pair of endless chains or a pair of endless belts, to cite two examples. The endless trains are arranged lengthwise in parallel spaced apart runs and travel between two pairs of sprockets (if chains) or pulleys (if belts), each sprocket or pulley pair being rotatably mounted on a respective common shaft. Each train has a multiplicity of mounting flanges attached thereto for accepting the carrier bars. The carrier bars are typically elongated and rectangular in shape, and are arranged perpendicular to the endless train runs, spanning the space between the trains. A carrier bar mounting aperture is located at each end of each carrier bar. The upper surface of each carrier bar has at least one concavity therein for holding a particular size and shape pellet-like item. Each carrier bar mounts on a respective pair of mounting flanges, one mounting flange on each train, the flanges being arranged to align with each end of the carrier bar. The mounting flanges have an upper surface which is in contact with the carrier bar and a lower surface opposite the upper surface. Each mounting flange also contains a receiving aperture which aligns with the carrier bar mounting aperture for receiving the quick connect/disconnect device as described below.

According to the method and device of the invention a carrier bar is demountably attached to the endless trains by placing each end of the bar on the upper surface of a respective mounting flange and aligning the carrier bar mounting apertures with the corresponding receiving apertures in the respective flanges, the carrier bar spanning between the endless trains.

A quick connect/disconnect device is then placed in each carrier bar mounting aperture by applying pressure to the retaining cap, thereby moving the plunger from its biased position within the central bore, while simultaneously inserting the shank into the mounting aperture. Applying pressure to the retaining cap moves the plunger within the central bore bringing the smaller diameter segment of the plunger adjacent to the passages within the shank. The balls, no longer forced outwardly by the larger diameter segment of the plunger are forced within the passages by contact with the mounting aperture side walls and the shank is then free to pass through the carrier bar mounting aperture and further into the receiving aperture of the endless train.

The head limits the movement of the device through the mounting aperture and the O-ring is sandwiched between the head and the carrier bar. Compressing the O-ring between the head and the carrier bar by applying pressure to the head causes the shank to travel further into the receiving aperture of the mounting flange to a point where the passages emerge clear of the receiving aperture sidewall on the opposite side of the mounting flange. Releasing the pressure on the retaining cap allows the plunger to move back to its biased position via the biasing spring, displacing the balls from the central bore into their respective passages and extending the balls beyond the shank outer surface. The shank length is dimensioned so that the carrier bar and the mounting flange are sandwiched between the head and the O-ring at one end, and the extended balls at the other end. The extended balls impinge on the opposite surface of the mounting flange, limiting the travel of the shank back through the receiving aperture, thus retaining the carrier bar to the train under preload due to the compressed O-ring trapped between the head and the carrier bar. The head can be dimensioned to lie flush with the surface of the carrier bar or can extend above the surface affording a means for gripping the quick connect/disconnect device.

When the plunger is in its biased position the shank will not pass through either the receiving or mounting apertures due to the fact that the balls are extended beyond the outer surface of the shank. As mentioned previously the shank is dimensioned to interfit tightly within both the mounting and receiving apertures, thus providing for precise alignment of the carrier bars on the trains. Even a relatively slight extension of the balls beyond the outer surface of the shank limits the travel of the shank within either aperture due to the relatively tight tolerance between shank diameter and aperture diameter.

This procedure is repeated for each mounting aperture on each carrier bar until all of the carrier bars are mounted on the endless train. To remove a carrier bar from the train, one applies pressure to the retaining cap of each quick connect/disconnect device engaging the carrier bar while simultaneously pulling the carrier bar away from the endless train. Pressure on the retaining cap allows the balls to retract into the passages and central bore, thereby freeing the shank to move through the endless train receiving aperture. The carrier bar is thus no longer retained to the endless train and can be pulled away. To remove the quick connect/disconnect device from the carrier bar one depresses the retainer cap while pulling on the head or pushing on the shank. Again the balls are free to retract into the passage and the central bore and the shank is thereby free to pass through the carrier bar mounting hole.

It is an object of this invention to provide a device and a method for quickly mounting and demounting carrier bars onto and from an endless train, the carrier bars and train comprising a conveyor adapted for conveying pellet-like items in a pellet marking machine.

It is another object of this invention to provide a device and a method for increasing the safety to technicians servicing a pellet marking machine.

It is an object of this invention to provide a device and a method for increasing the versatility of pellet marking machines by allowing such machines to be readily converted to process pellet-like items of different sizes and shapes.

It is yet another object of this invention to provide a device and a method for decreasing machine downtime associated with servicing pellet marking machines, especially downtime associated with converting the machine to process pellet-like items of different sizes and shapes.

It is another object of this invention to provide a device for improving the alignment characteristics of carrier bars in a pellet marking machine.

It is still another object of this invention to provide a device and a method for manually converting a pellet marking machine to process pellet-like items of different sizes and shapes with a minimum of tools.

These and other objects and advantages will become apparent from a consideration of the following drawings and detailed description of the invention.

It is another object of this invention to provide a device and a method for manually converting a pellet marking machine which provides for an improved means of handling and storing carrier bar components which are not in use.

BRIEF DESCRIPTION OF THE DRAWINGS

FIG. 2 is an isometric exploded view of a portion of the endless conveyor comprised of endless chains and mounting interchangeable carrier bars via quick connect/disconnect devices;

DETAILED DESCRIPTION OF THE PREFERRED EMBODIMENT

Figure 1:
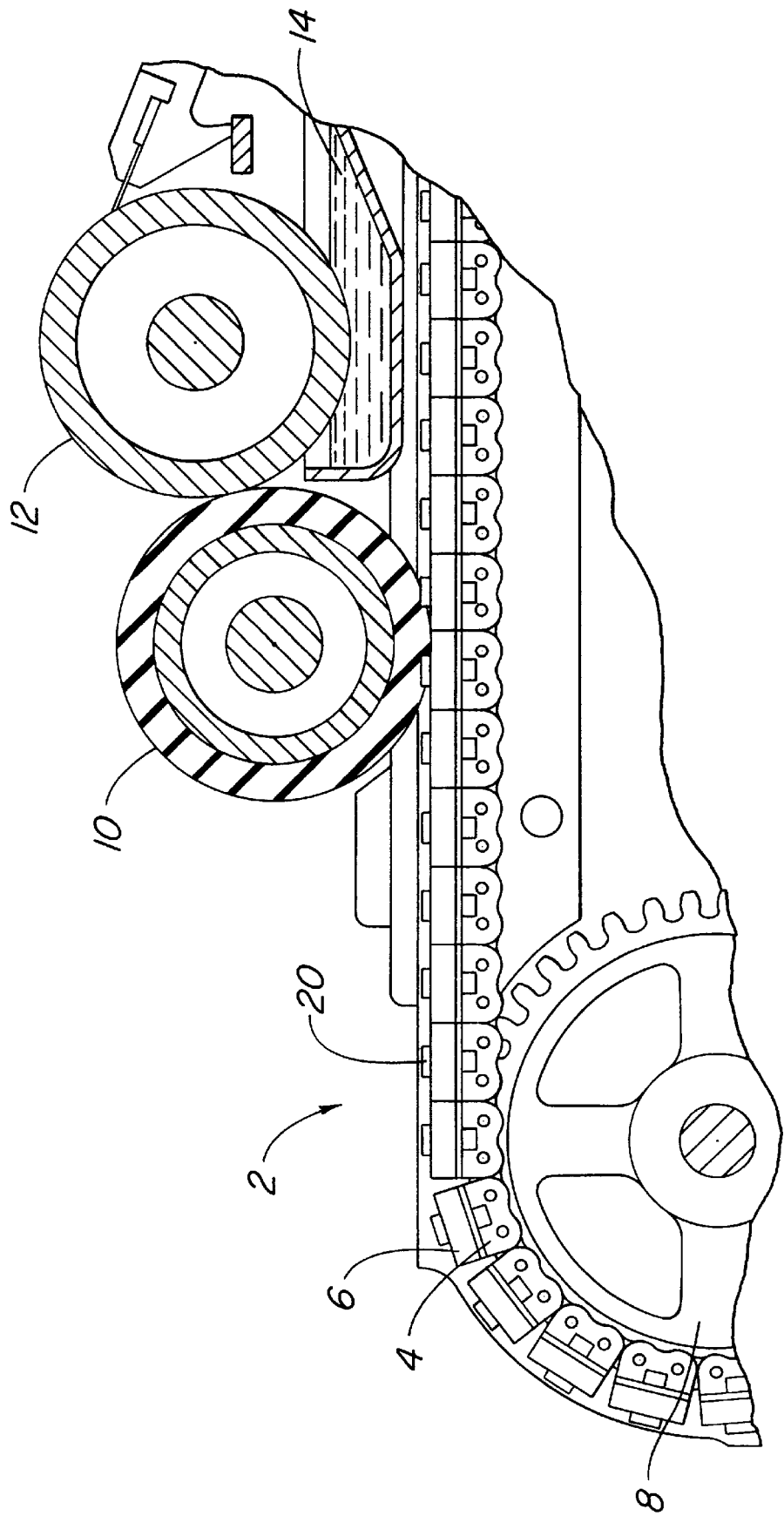
FIG. 1 is a partial side view of a pellet marking machine conveyor passing beneath a printing roller.
Figure 2A:
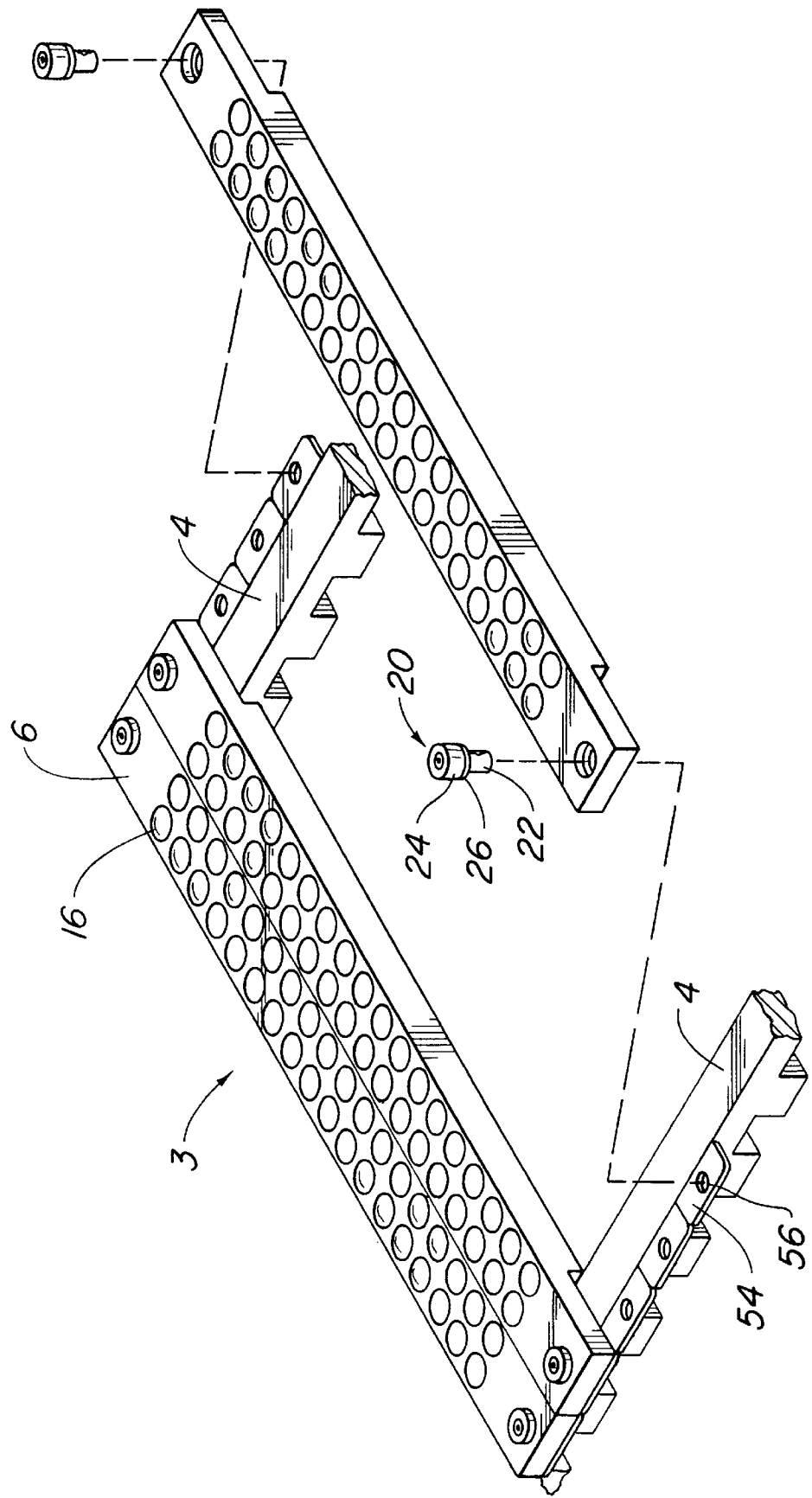
FIG. 2a is an isometric exploded view of a portion of the endless conveyor comprised of endless belts and mounting interchangeable carrier bars via quick connect/disconnect devices.

FIGS. 1, 2 and 2a show portions of endless conveyors 2 and 3, each comprised of a pair of endless trains 4 and mounting a multiplicity of individual carrier bars 6. The term "endless train" is used herein to describe a continuous means of conveyance, for example, an endless chain (as seen in FIG. 2), an endless belt (as seen in FIG. 2a) or similar components comprising part of the endless conveyor upon which carrier bars 6 are mounted. FIGS. 1 and 2 illustrate examples of trains 4 comprised of endless chains which travel between two pairs of sprockets similar to sprocket 8. FIG. 2a illustrates endless trains 4 comprised of endless timing belts which travel between respective pairs of gears (not shown). Each sprocket or gear pair is typically rotatably mounted on a respective common shaft. Although the figures and description herein generally show an endless chain, it is to be understood that the endless chain is merely illustrative of the generic concept embodied in the term "endless train" and should not be interpreted as to limit the application of the invention.

Referring again to FIG. 1, one of the sprockets 8 is shown in detail in FIG. 1, and conveyor 2 is propelled by drive sprockets 8 in a counter clockwise circuit bringing carrier bars 6 beneath printing roller 10, which rotates clockwise (as viewed in FIG. 1). Printing roller 10 picks up ink laden images from transfer roller 12 which acquires ink from reservoir 14 as roller 12 rotates counter clockwise (as viewed in FIG. 1). The ink laden images on printing roller 10 are spaced apart circumferentially on the surface of printing roller 10 at predetermined intervals and the rotation of printing roller 10 is synchronized with the circulation of endless conveyor 2 such that the images are imprinted on pellet-like items 18 held in concavities 16 in carrier bars 6, seen in FIG. 2, as the pellet-like items pass beneath and are contacted by the printing roller 10.

Figure 3:
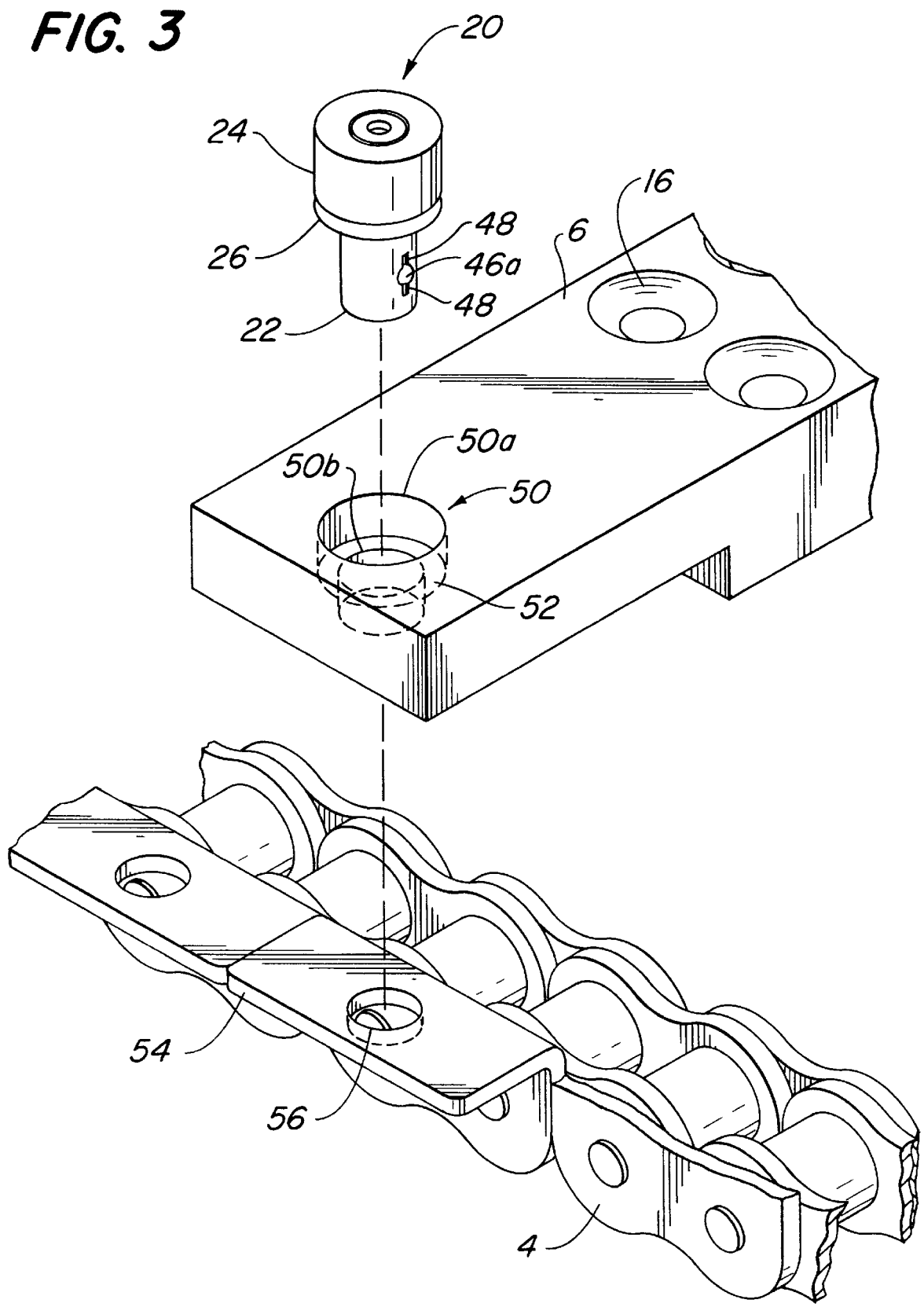
FIG. 3 is a detailed view of a quick connect/disconnect device attaching a carrier bar to an endless train conveyor.
Figure 4:
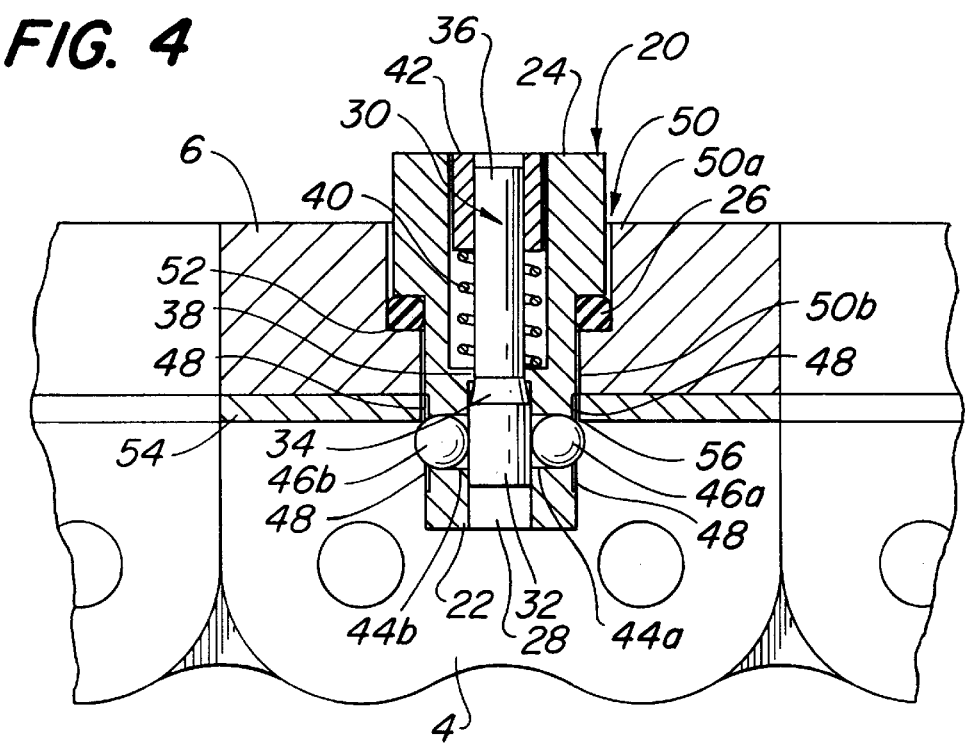
FIG. 4 is a longitudinal sectional side view of a quick connect/disconnect device retaining a carrier bar to an endless train conveyor.
Figure 5:
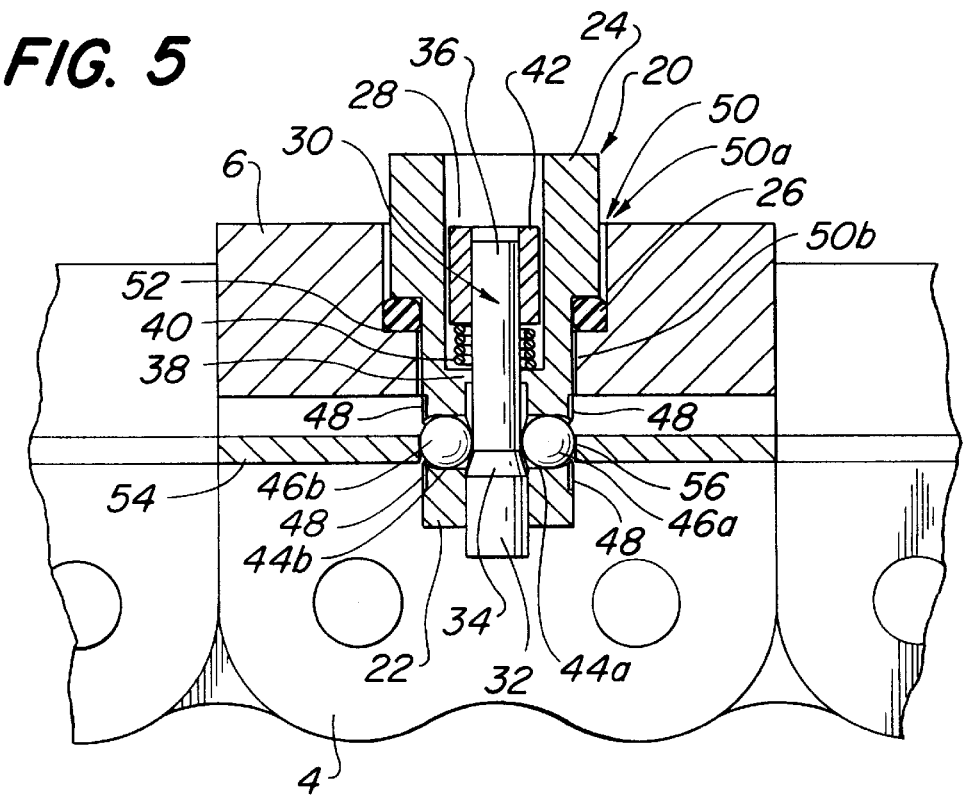
FIG. 5 is a longitudinal sectional side view of a quick connect/disconnect device releasing a carrier bar from an endless train conveyor.

Carrier bars 6 are most conveniently demountably attached to the endless trains 4 by means of a quick connect/disconnect device 20, seen in FIGS. 1–5 and best illustrated in FIGS. 3–5. Device 20 has a shank 22 and an enlarged head 24. An elastic O-ring 26 is disposed around shank 22 adjacent to enlarged head 24. O-ring 26 provides a preloading and biasing function as will be explained later. A central bore 28 extends longitudinally through both shank and head, as seen in FIGS. 4 and 5. Central bore 28 houses a plunger 30 which has a segment of larger diameter 32, whose diameter is slightly smaller than the central bore throughout the shank 22, a tapering segment 34, and a segment of smaller diameter 36, whose diameter is considerably smaller than the central bore 28. A shoulder 38 is undercut into the central bore 46 marking a reduction in diameter of the central bore approximately at the mid point of the shank 22. Plunger 30 is arranged within central bore 28 with its smaller diameter segment 36 substantially adjacent to enlarged head 24 and the larger diameter segment 32 towards the end of shank 22 opposite head 24. Tapering segment 34 of plunger 30 is designed to seat against shoulder 38 and the shoulder thus prevents plunger 30 from passing entirely through central bore 28. A biasing spring 40, resting against shoulder 38, is disposed in the central bore 28 adjacent to the enlarged head 24 around smaller diameter segment 36. A plunger cap 42, having an outer diameter slightly smaller than the central bore 28 is attached to the end of smaller diameter segment 36 adjacent to head 24. Biasing spring 40 is trapped between shoulder 38 and plunger cap 42 and biases plunger 30 within the central bore 28, forcing tapering segment 34 to seat against shoulder 38 in the normal biased position shown in FIG. 4.

Quick connect/disconnect device 20 has at least one, but preferably two passages 44a and 44b oriented radially near the end of shank 22 opposite head 24, as seen in FIGS. 4 and 5. Passages 44a and 44b communicate between the outer surface of shank 22 and the central bore 28. Each passage has a respective ball 46a and 46b contained therein. The diameters of balls 46a and 46b are slightly smaller than the diameters of their respective passages 44a and 44b, allowing the balls to move freely into and out of the passages, however, the diameters of the balls 46a and 46b are slightly greater than the lengths of the respective passages 44a and 44b, thus a portion of each ball must always project from the respective passage, either outwardly beyond shank 22 as seen in FIG. 4, or inwardly into central bore 28, as seen in FIG. 5. Since the balls 46a and 46b are slightly smaller in diameter than passages 44a and 44b the passages are preferably staked at the outer surface of shank 22, as shown by distortions 48 in FIGS. 3–5, in order to retain the balls within the passages. "Staking" is a means of retaining something in an aperture or passage by impaling the exposed end of the passage with a punch to permanently distort the shape of the passage locally. Local distortions 48 narrow the ends of passages 44a and 44b. The distortions 48 impinge on the surfaces of balls 46a and 46b, thereby preventing the balls from freely rolling out of the passage while allowing a portion of each ball to extend beyond the shank surface, as seen in FIG. 4.

Biasing spring 40 normally biases plunger 30 to the position within central bore 28 shown in FIG. 4 wherein tapering segment 34 seats against shoulder 38. This normal biased position places the larger diameter segment 32 of plunger 30 adjacent to passages 44a and 44b. Because the larger diameter segment 32 substantially fills the central bore 28, balls 46a and 46b are displaced from the central bore 28 and forced against the staking distortions 48 at the ends of passages 44a and 44b, the balls 46a and 46b being then positioned so as to project beyond shank 22. In this normal biased position tapering segment 34 of plunger 30 is held fast against shoulder 38 by the action of biasing spring 40 trapped between shoulder 38 and plunger cap 42. When plunger 30 is moved within central bore 28 by manually depressing plunger cap 42 as seen in FIG. 5, biasing spring 40 is compressed between plunger cap 42 and shoulder 38 and the smaller diameter segment 36 of plunger 30 moves to a position adjacent to passages 44a and 44b. Smaller diameter segment 36 is dimensioned to allow balls 46a and 46b to project partially into central bore 28 but still remain substantially within passages 44a and 44b respectively. When balls 46a and 46b project into central bore 28 they retract into the passages 44a and 44b and no longer project beyond shank 22, as shown in FIG. 5. When pressure is released on plunger cap 42 biasing spring 40 moves plunger 30 back to its normal biased position. Tapering segment 34 of plunger 30 engages balls 46a and 46b which are projecting into central bore 28, forcing the balls into their respective passages 44a and 44b. As plunger 30 continues to move under the action of biasing spring 40 larger diameter segment 32 contacts balls 46a and 46b forcing the balls completely out of central bore 28 and into passages 44a and 44b, the motion of the balls being halted by the staking distortions 48, the balls being trapped between the larger diameter segment 32 and the staking distortions 48, the balls partially projecting beyond shank 22 as illustrated in FIG. 4.

FIGS. 2–5 illustrate how quick connect/disconnect device 20 is used to demountably attach the carrier bars 6 to the endless trains 4 on an endless conveyor. In FIGS. 3–5 details of attachment are illustrated for one end of one carrier bar 6 attached to one endless train 4, although it is to be understood that the method of attachment is identical for both ends of all carrier bars as they are mounted on both endless trains 4 to comprise the endless conveyor 2 as shown in FIGS. 1 and 2.

Device 20 interfits within a mounting aperture 50 in the end of carrier bar 6, shown in FIG. 3. Mounting aperture 50 has a cylindrical countersink 50a having a relatively large diameter, and a smaller diameter pilot aperture 50b, counter sink and pilot aperture together forming a shoulder 52 in carrier bar 6. Countersink 50a receives the enlarged head 24 of the device and pilot aperture 50b receives shank 22. Enlarged head 24 of device 20 limits the travel of device 20 through the carrier bar mounting aperture 50 by forcing O-ring 26 against shoulder 52 as seen in FIG. 4. O-ring 26 is slightly oversized compared with the diameter of countersink 50a, thus impinging elastically against countersink 50a and holding device 20 within mounting aperture 50.

Carrier bar 6 sits on a flange 54 extending horizontally from endless train 4, as shown in FIGS. 2–5, and shank 22 of device 20 further engages a receiving aperture 56 disposed in flange 54 and aligned with mounting aperture 50. (As seen in FIGS. 2 and 2a, there is one flange 54 and one receiving aperture 56 on each endless train 4 for each carrier bar 6 of the multiplicity of carrier bars to be mounted on the endless trains 4).

As seen in FIG. 4, the quick connect/disconnect device retains the carrier bar 6 to the endless train 4 when shank 22 passes through pilot aperture 50b in carrier bar 6 and receiving aperture 56 in flange 54. Shank 22 extends through receiving aperture 56 in flange 54 such that passages 44a and 44b are clear of the lower surface of flange 54, allowing balls 46a and 46b to project beyond shank 22 and impinge upon the lower surface of flange 54 at the edge of the receiving aperture 56, shown in detail in FIG. 4. Shoulder 52 of carrier bar 6 is thus sandwiched between enlarged head 24, O-ring 26 and flange 54, and balls 46a and 46b extend beyond shank 22 to impinge on the under surface of flange 54 adjacent to receiving aperture 56 and retain device 20 to flange 54, thereby limiting the travel of device 20 through the receiving aperture 56 and thus retaining carrier bar 6 to endless train 4.

O-ring 26 is positioned on shank 22 adjacent to enlarged head 24 to provide an elastic preloading to device 20. The thickness of O-ring 26 is coordinated with the position of passages 44a and 44b in shank 22 and the thicknesses of shoulder 52 and flange 54 such that the O-ring must be compressed between enlarged head 24 and shoulder 52 of carrier bar 6 in order for passages 44a and 44b to clear the lower surface of flange 54 and allow balls 46a and 46b to be displaced into passages 44a and 44b by larger diameter segment 32 of plunger 30 and thereby extend fully beyond shank 22 to impinge on the lower surface of flange 54. The preload of O-ring 26 exerts an upward biasing force on device 20 forcing balls 46a and 46b to seat against the lower surface of flange 54, shown in FIG. 4. The biasing force holds carrier bar 6 relatively tightly against flange 54 and prevents unwanted relative motion between the carrier bar and the endless train 4. The preload helps reduce the potential for unwanted vibration of the carrier bars during motion of conveyor 2 and allows the conveyor to be integrated into a pellet marking machine having moving parts with relatively tight tolerances. Without an elastic preload means it is possible that carrier bars could come loose with wear and rattle on the endless train, or strike other parts of the machine during train movement.

Close tolerances are held between the diameters of shank 22, pilot aperture 50b, and receiving aperture 56. Receiving apertures 56 in flanges 54 and mounting apertures 50 in carrier bars 6 are also precisely positioned relative to each other. Precise positioning and close tolerances between these mating components ensure that carrier bars 6 will be precisely aligned on the conveyor 2 inherently when quick connect/disconnect device 20 is used to attach carrier bars 6 to the endless trains 4. Using the device 20 eliminates the need to further adjust the alignment of the carrier bars relative to the endless trains once mounted. The precise alignment of the carrier bars on the train allows the carrier bars to reliably receive, transport, and transfer pellet-like items 18 to be imprinted by printing roller 10.

The advantage of the quick connect/disconnect device 20 can be demonstrated by describing the process by which a conveyor 2 in a pellet marking machine may be converted to handle different types of pellet-like items. In a pellet marking machine, concavities 16 (seen in FIG. 2) in carrier bars 6 on conveyor 2 are matched in size and shape to efficiently receive pellet-like items 18 and reliably transport them to the printing roller 10 and then discharge the items from the machine for further processing. As stated previously, it is important that concavities 16 be matched with pellet-like items 18 to ensure efficient and reliable operation of the machine, yielding a high product throughput with a minimum of product wastage. There are at least four problems associated with a poor match between the size and shape of concavities 16 and the pellet-like items to be imprinted: 1) items which are too large for their receiving concavities may tend to dislodge from the carrier bars due to machine vibration during operation, roll loose on the conveyor, be crushed by the printing roller 10, foul moving parts of the machine, and perhaps cause a stoppage of the machine altogether; 2) items which are not consistently positioned and held within the concavities of the carrier bar due to size or shape mismatch will not consistently contact the printing roller 10 and therefore not have the indicia printed in a consistent, desired location during the imprinting step; 3) items which lodge too deeply within an oversized concavity may only receive a partial imprint of the indicia, or 4) may receive no imprint at all.

When the production run for a particular pellet-like item, such as pill 18, is complete, conveyor 2 can be easily converted to process a different pellet-like item, such as capsule 19 shown in FIG. 2. To effect the conversion of conveyor 2 from processing pellet-like items 18 to pellet-like items 19 a technician replaces each carrier bar 6 on conveyor 2 with a carrier bar suited to the new item 19 by the following procedure.

As seen in FIG. 1, access to carrier bars 6 is conveniently afforded at drive sprocket 8 where the carrier bars separate slightly as they rotate relatively to each other due to the sprocket curvature. Using an awl or similar tool the technician chooses a particular carrier bar 6 and depresses plunger cap 42 in the quick connect/disconnect device 20 attaching the chosen carrier bar to endless train 4. As shown in FIG. 5, depressing plunger cap 42 moves plunger 30 against biasing spring 40, compressing the spring between plunger cap 42 and central bore shoulder 38. As plunger 30 moves downwardly within central bore 28 larger diameter plunger segment 32 moves out of alignment with passages 44*a* and 44*b*, and smaller diameter plunger segment 36 aligns adjacent to the passages. Balls 46*a* and 46*b*, previously displaced into passages 44*a* and 44*b* (seen in FIG. 4) by the presence of larger diameter plunger segment 32 are permitted to retract into passages 44*a* and 44*b* and extend partially into central bore 28 against smaller diameter plunger segment 36 (seen in FIG. 5). Balls 46*a* and 46*b* are forced into this configuration by the elastic forces of O-ring 26 pushing against enlarged head 24 and raising device 20 upwardly relative to the carrier bar and the flange 54. The lower surface of flange 54 adjacent to receiving aperture 56 impinges on the curved surface of balls 46*a* and 46*b*, forcing the balls inwardly once larger diameter plunger segment 32 is out of alignment with passages 44*a* and 44*b*. Once balls 46*a* and 46*b* are no longer extended and engaging the lower surface of flange 54, shank 22 may be freely withdrawn through receiving aperture 56 by lifting the carrier bar 6 from endless train 4, as shown in FIG. 5. Once the technician performs the same sequence of steps on the quick connect/disconnect device at the other end of the chosen carrier bar 6 to free the carrier bar from endless train 4, the carrier bar may be completely removed from the conveyor 2.

It is preferred that each carrier bar have a dedicated pair of quick connect/disconnect devices which, although removable, are not generally removed from the carrier bar, but remain with the carrier bar when it is interchanged. Although using dedicated devices requires having at least a pair of quick connect/disconnect devices for each carrier bar, the use of dedicated devices reduces the potential for misplacing the quick connect/disconnect devices, and saves time by eliminating the need to transfer the quick connect/disconnect devices from one carrier bar to its replacement. For the sake of completeness, the following paragraph describes the use of non-dedicated devices which must be transferred to the replacement carrier bar which may then be mounted on the conveyor chain, but it is to be understood that this step can be eliminated, and other advantages secured, if, as preferred, quick connect/disconnect devices remain with the carrier bars.

As noted above, the quick connect/disconnect devices may be removed from the chosen carrier bar 6 and inserted into the replacement carrier bar which has concavities matched to the new pellet-like items 19. Once again, the technician depresses plunger cap 42, allowing balls 46*a* and 46*b* to retract into passages 44*a* and 44*b* and extend into central bore 28. Simultaneously with depressing the plunger cap, the technician grips the exposed portion of enlarged head 24 and pulls device 20 upwardly relative to carrier bar 6. (If enlarged head 24 is flush with carrier bar 6, leaving no exposed portion to grip, the technician must push upwardly on the lower end of shank 22 instead). The lower edge of shoulder 52 impinges on balls 46*a* and 46*b*, forcing the balls into the passages 44*a* and 44*b* thereby allowing shank 22 to be freely withdrawn through pilot aperture 50*b*. Device 20 may now be used to attach the replacement carrier bar to conveyor 2.

The process of attaching the replacement carrier bar to the conveyor is essentially the reverse of the process described above to remove the old carrier bar. It should be understood that two quick connect/disconnect devices 20 are used to attach each replacement carrier bar to endless trains 4, so the following steps must be performed for each device, although the procedure will be described for only one device 20. It is further understood that the replacement carrier bar is substantially identical in structure with the old carrier bar, with the exception of the shape and size of the concavities. Thus the same reference characters are used to describe the replacement carrier bar in the following procedure.

First a quick connect/disconnect device 20 is inserted by the technician into the pilot aperture 50*b* of the replacement carrier bar. The shank 22 will not pass through the pilot aperture however because the balls 46*a* and 46*b* will be extended beyond the shank because biasing spring 40 keeps plunger 30 in its normally biased position wherein larger diameter segment 32 is aligned with passages 44*a* and 44*b*, effectively displacing balls 46*a* and 46*b* from central bore 28 fully into and extending from passages 44*a* and 44*b*. The technician depresses plunger cap 42 however and moves plunger 30 against its biasing spring 40, bringing the smaller diameter plunger segment 36 into alignment with passages 44*a* and 44*b*. The upper surface of shoulder 52 impinges on the extended curved surfaces of balls 46*a* and 46*b*. The balls retract, being free to withdraw into the passages 44*a* and 44*b* and extend into the central bore 28, and shank 22 passes freely into pilot aperture 50*b*. Once passages 44*a* and 44*b* are clear of the side wall of pilot aperture 50*b* the technician releases the pressure on plunger cap 42 allowing the plunger to snap back to its normally biased position under the action of biasing spring 40, forcing balls 46*a* and 46*b* to extend outwardly beyond shank 22. The technician seats O-ring 26 against shoulder 52, and the O-ring is sandwiched between enlarged head 24 and the shoulder. A substantial portion of shank 22 projects downwardly from pilot aperture 50*b*. The replacement carrier bar is then positioned by the technician on the conveyor 2 spanning the space between the endless trains 4. The technician positions the end of the replacement carrier bar above an exposed flange 54 and aligns mounting aperture 50 with receiving aperture 56. This aligns shank 22 with the receiving aperture 56 in flange 54, and the technician then engages shank 22 with receiving aperture 56. Shank 22 will not enter receiving aperture 56 however because balls 46*a* and 46*b* are extended outwardly and impinge on the upper surface of flange 54 adjacent to receiving aperture 56. Again, by depressing plunger cap 42 the technician allows the balls to retract as the upper surface of flange 54 impinges on balls 46*a* and 46*b*, forcing them into passages 44*a* and 44*b*. With the balls retracted, shank 22 then passes into receiving aperture 56 and the carrier bar seats against flange 54. However, the balls cannot re-extend outwardly from shank 22 until the passages 44*a* and 44*b* pass completely through receiving aperture 56 and clear the lower surface of flange 54. To force the passages 44*a* and 44*b* clear of the flange the technician must apply pressure downwardly on enlarged head 24. This causes O-ring 26 to be compressed between head 24 and shoulder 52 as device 20 moves downwardly relatively to the replacement carrier bar and the flange 54. Forcing device 20 downwardly moves passages 44*a* and 44*b* clear of the lower surface of flange 54, and balls 46*a* and 46*b* are free to extend outwardly from shank 22, uninhibited by the side wall of receiving aperture 56. The technician next releases plunger cap 42, which snaps to its normally biased position causing balls 46*a* and 46*b* to extend outwardly beyond the surface of shank 22. The technician next releases the pressure on enlarged head 44. This allows elastic O-ring 26 to expand and relax somewhat, moving device 20 upwardly relative to the replacement carrier bar and flange 54. The extended balls 46*a* and 46*b* are pulled snug against the lower surface of flange 54, as seen in FIG. 4, and the replacement carrier bar is securely but demountably attached to the conveyor 2.

The procedures described above for removing and replacing carrier bars on conveyor 2 are repeated for each end of each carrier bar until all of the old carrier bars matched to pellet-like item 18 are replaced by replacement carrier bars matched to the new pellet-like item 19. It will be necessary for the technician to advance conveyor 2 periodically to bring the carrier bars 6 within easy reach, preferably overlying drive sprocket 8. Once all of the carrier bars are replaced the conveyor is then ready to transport the new pellet-like items quickly and efficiently.

Four distinct advantages accrue through the use of quick connect/disconnect devices to attach carrier bars to the endless conveyor in a pellet marking machine. These advantages are 1) conversion of the machine from one pellet-like item to another is more quickly and easily effected, 2) conversion is more reliably effected, 3) conversion is more safely effected, and 4) the carrier bar alignment steps normally required when conventional means are employed can be entirely eliminated.

Using quick connect/disconnect devices, replacing carrier bars on a conveyor is quickly and easily accomplished by one technician with a minimum of tools. Normally, if nuts and bolts are used to attach the carrier bars to the conveyor, each bolt must be individually hand torqued by the technician. As this requires torquing hundreds of bolts the conversion process is both tedious and time consuming. The quick connect/disconnect devices require no torquing, just insertion of the shank into the mounting and receiving apertures along with simple manipulation of the plunger. Due to the large number of bolts, use of quick connect/disconnect devices acts as a multiplier on the efficiency of the conversion process, allowing significant time savings on each carrier bar replacement.

Replacement of carrier bars is more reliably effected through the use of a quick connect/disconnect device, as the technician can tell simply from a visual inspection of the conveyor which carrier bars are positively retained to the endless trains and which are not. The absence of a device, or a device projecting higher than normal above a carrier bar on the conveyor gives an immediate indication of which carrier bars are not attached. When nuts and bolts are used to attach the carrier bars to the conveyor, the technician must test the torque of each bolt individually to be sure that the carrier bars are properly attached. It is not possible to determine by a visual inspection if a bolt is sufficiently tightened or if a nut is loose or missing.

Use of quick connect/disconnect devices affords greater safety because the technician need not place his hand within the pellet marking machine to change carrier bars. Using a conventional attachment, as when nuts and bolts are used for example, the bolt typically passes through the carrier bar and the flange on the endless train and engages a nut adjacent to the lower surface of the flange. The technician must place one hand within the machine to hold the nut with a wrench while tightening the bolt with a tool from outside the machine. The technician risks severe injury should the machine start up unexpectedly while his hand is within the machine. Use of the quick connect/disconnect device enables the technician to perform all tasks related to carrier bar replacement from outside of the machine, an inherently safer environment.

Finally, the quick connect/disconnect devices provide for fast and sure alignment of the carrier bars on the conveyor without the need for laborious alignment steps required by conventional carrier bar attachment means. When conventional nut and bolt attachment of carrier bars is employed, the carrier bars are aligned by first loosely bolting the carrier bars to the endless trains, allowing the bars to move relatively to the endless trains. The conveyor is then run and the carrier bars are pushed into alignment by contact with other parts of the machine as the conveyor moves in its circuit. Once the bars are aligned, the technician then torques each bolt to a specified tension to hold the carrier bars in alignment on the conveyor. By using the quick connect/disconnect devices however, the alignment steps are unnecessary. By holding close tolerances between the device shank diameter and the mounting and receiving aperture diameter and location, the carrier bars are precisely aligned automatically when the quick connect/disconnect device is engaged with the mounting aperture of the carrier bar and the receiving aperture of the flange. Close tolerances between shank and apertures eliminate lateral and longitudinal movement of the carrier bars on the conveyor and the preload provided by the O-ring keeps the carrier bar securely fastened to the flange, preventing up and down motion of the bar relatively to the train.

We claim:

1. In a machine for receiving, orienting, conveying, and imprinting an intelligence on a series of pellet-like items, the machine having a carrier bar having a mounting aperture and an endless train having a receiving aperture, the endless train and carrier bar being adapted for conveying the pellet-like items, the carrier bar having at least one concavity therein facing away from the endless train for holding a pellet-like item, the combination of the carrier bar and the endless train with a quick connect/disconnect device for manually demountably attaching the carrier bar to the endless train, the quick connect/disconnect device comprising:

an elongated movable shank having first and second ends, said first end interfitting within the receiving aperture of the endless train, said second end projecting therefrom and interfitting into the mounting aperture of the carrier bar;

first retaining means disposed at said first end of said elongated shank for limiting the travel of said elongated shank into the endless train receiving aperture;

second retaining means disposed at said second end of said elongated shank for limiting the travel of said elongated shank into the carrier bar mounting aperture;

the endless train and the carrier bar being thus sandwiched between said first and said second retaining means;

retracting means within said elongated shank for retracting one of said first and second retaining means, said retracting means being movable between a first position wherein said one of said first and second retaining means is extended into an elongated shank travel limiting position and a second position wherein said one of said first and second retaining means is retracted away from the elongated shank travel limiting position, thus releasing the endless train and the carrier bar from the sandwiched position; and biasing means interengaging both said elongated shank and said retracting means for biasing said retracting means toward said first position, thereby retaining the carrier bar to the endless train.

2. A device according to claim 1, wherein said first retaining means comprises a movable member disposed at said first end of said elongated shank, said elongated shank having means for housing said member within said shank, said member being movable within said housing means between an extended position wherein said member projects outwardly from said housing means and extends from said elongated shank in said travel limiting position, and a retracted position wherein said member is withdrawn into said housing means and contained within said elongated shank, said member being retracted away from said travel limiting position thereby.

3. A device according to claim 1, wherein said second retaining means comprises a head attached to said second end of said elongated shank, said head being larger than the mounting aperture in the carrier bar and thereby limiting travel of said elongated shank into the carrier bar mounting aperture.

4. A device according to claim 1, wherein said elongated shank has a longitudinal bore therethrough adapted to house said retracting means, said retracting means comprising a second elongated shank movable within said bore between said first and said second positions, said second elongated shank having means at one end thereof adapted for engaging and extending one of said first and said second retaining means into said elongated shank travel limiting position, said second elongated shank further having means at an opposite end adapted for manual positioning of said second elongated shank at said first and said second positions within said bore.

5. A device according to claim 1, wherein said biasing means is disposed within said elongated shank, said elongated shank having a first seating means interengaging and retaining said biasing means within said elongated shank, said retracting means having a second seating means interengaging and retaining said biasing means to said retracting means, said biasing means being sandwiched within said shank between said first and second seating means and thereby biasing said retracting means toward said first position within said elongated shank.

6. A device according to claim 1 having a means for preloading said device, said preloading means being disposed on said elongated shank adjacent to said second retaining means.

7. A device according to claim 1 wherein said endless train comprises an endless chain.

8. A device according to claim 1 wherein said endless train comprises an endless belt.

9. In a machine for receiving, orienting, conveying and imprinting an intelligence on a series of pellet-like items, the machine having a carrier bar having a mounting aperture and an endless train having a receiving aperture, the endless train and carrier bar being adapted for conveying pellet-like items, the carrier bar having at least one concavity therein facing away from the endless train for holding a pellet-like item, the combination of the carrier bar and the endless train with a quick connect/disconnect device for manually demountably attaching the carrier bar to the endless train, the quick connect/disconnect device comprising:

an elongated movable shank having first and second ends and an outer surface, said first end interfitting within the receiving aperture of the endless train, said second end projecting therefrom and interfitting into the mounting aperture of the carrier bar;

said elongated shank further having a longitudinal bore therethrough and a passage oriented perpendicular to said bore, said passage being disposed at said first end and communicating between said bore and said outer surface of said elongated shank;

first retaining means comprising a member movably disposed within said passage, said member being movable within said passage between a travel limiting position wherein said member projects outwardly from said passage beyond said outer surface thereby limiting the travel of said elongated shank into the endless train receiving aperture, and a retracted position wherein said member is wholly contained within said passage and said bore of said elongated shank;

second retaining means comprising an enlarged head attached to said second end of said elongated shank, said head being adapted to interengage the carrier bar and limit travel of said elongated shank through the carrier bar mounting aperture;

retracting means comprising a plunger disposed within said bore, said plunger comprising a first section adapted to engage said movable member and move said member within said passage outwardly into said travel limiting position, said plunger further comprising a second section disposed adjacent to said first section, said second section being adapted to allow said movable member to move within said passage into said bore, said member being thereby wholly contained within said passage and said bore, said plunger being movable within said bore between a first position wherein said first section is disposed adjacent to said passage, said first section being interengaged with said movable member, and a second position wherein said second section is disposed adjacent to said passage, said plunger further having a manual means for positioning said plunger at said first and second positions, said manual positioning means being disposed adjacent to said second section; and biasing means disposed within said bore between said elongated shank and said plunger, said elongated shank having a first seat arranged within said bore being adapted to engage said biasing means, said plunger having a second seat disposed adjacent to said second section, said second seat being adapted to engage said biasing means, said biasing means biasing said plunger relatively to said elongated shank to said first position.

10. A device according to claim 9, wherein said elongated shank is cylindrical.

11. A device according to claim 9 having a second passage oriented perpendicular to said bore, said second passage being disposed at said first end and communicating between said bore and said outer surface.

12. A device according to claim 11 having a second member movably disposed within said second passage, said second member being movable within said second passage between a travel limiting position wherein said second member projects outwardly from said passage beyond said outer surface thereby limiting the travel of said elongated shank into the endless train receiving aperture, and a retracted position wherein said second member is wholly contained within said second passage and said bore of said elongated shank.

13. A device according to claim 9, wherein said biasing means comprises a coil spring, said second section of said plunger being coaxially aligned with said coil spring within said bore.

14. A device according to claim 9 having a means for preloading said device, said preloading means being mounted on said outer surface of said elongated shank adjacent to said enlarged head.

15. A device according to claim 14, wherein said preloading means comprises an elastic O-ring.

16. A device according to claim 9 wherein said endless train comprises an endless chain.

17. A device according to claim 9 wherein said endless train comprises an endless belt.

18. In a machine for receiving, conveying, orienting and imprinting an intelligence on a series of pellet-like items, the machine having individual carrier bars mounted on an endless train, the endless train having means for mounting the carrier bars attached thereto, the carrier bars having mounting apertures therein, the mounting means having receiving apertures, the combination of the carrier bars and the endless train with a quick connect/disconnect device for manually demountably attaching a carrier bar to the mounting means, said quick connect/disconnect device comprising:

an elongated shank having first and second ends, said shank having a head attached to said second end, said head having a bearing surface adjacent to said shank, said shank and said head having a common axial bore therethrough, said shank having at least one passage disposed radially to said axial bore at said first end;

an elongated plunger slidably disposed within said axial bore, said plunger having a region of relatively larger diameter and a region of relatively smaller diameter, said region of larger diameter substantially filling said axial bore;

means for biasing said plunger to a predetermined position within said axial bore having said region of larger diameter normally positioned adjacent to said passage, sliding movement of said plunger against said biasing means bringing said region of smaller diameter adjacent to said passage;

a ball movably disposed within said passage and having a diameter greater than the length of said passage, said passage having means for retaining said ball partially within said passage, a portion of said ball projecting outwardly from said passage beyond said shank when said region of larger diameter of said plunger is adjacent to said passage thereby displacing said ball outwardly from said bore, said ball being free to move into said passage and extend into said bore when said region of smaller diameter of said plunger is adjacent to said passage;

said second end of said shank interfitting within the mounting aperture in said carrier bar, said bearing surface impinging on said carrier bar adjacent to said mounting aperture thereby retaining the carrier bar to said shank, said first end of said shank interfitting within said receiving aperture in said mounting means, said ball impinging on the mounting means when said ball is projecting outwardly beyond said shank, said shank being retained to said mounting means thereby, the carrier bar and mounting means being sandwiched between said ball and said head, the carrier bar being retained to the mounting means thereby, said shank being released from the mounting means by moving said plunger against said biasing means and positioning said region of smaller diameter adjacent to said passage, said ball disengaging from said mounting means and moving into said passage releasing said shank from the mounting means and thereby the carrier bar.

19. A device according to claim 18 wherein:

said shank further comprises a shoulder located within said bore between said passage and said head, said shoulder engaging said region of larger diameter on said plunger and limiting the movement of said plunger within said bore;

said biasing means comprises a spring located within said bore adjacent to said shoulder opposite said region of larger diameter on said plunger;

said plunger having means mounted thereon for retaining said spring within said bore, said spring being sandwiched between said spring retaining means and said shoulder and biasing said plunger to said predetermined position within said bore.

20. A device according to claim 19, wherein said means for retaining said ball partially within said passage comprises staking said shank at the end of said passage opposite said bore.

21. A device according to claim 18 having a preloading means comprising an elastic O-ring encircling said elongated shank adjacent to said head.

22. In conjunction with a machine for receiving, orienting, conveying, and imprinting an intelligence on a series of pellet-like items, a method for manually demountably attaching a carrier bar having a mounting aperture to an endless train having a receiving aperture, the endless train and carrier bar being adapted for conveying pellet-like items, the carrier bar having at least one concavity therein facing away from the endless train for holding a pellet-like item, said method employing a quick connect/disconnect device comprising an elongated movable shank having first and second ends, said first end interfitting within the receiving aperture of the endless train, said second end projecting therefrom and interfitting into the mounting aperture of the carrier bar, first retaining means disposed at said first end of said elongated shank for limiting the travel of said elongated shank into the endless train receiving aperture, second retaining means attached to said second end of said elongated shank for limiting the travel of the elongated shank into the carrier bar mounting aperture, retracting means within said elongated shank for retracting one of said first and second retaining means, said retracting means being movable between a first position wherein said one of said first and second retaining means is extended into an elongated shank travel limiting position and a second position wherein said one of said first and second retaining means is retracted away from the elongated shank travel limiting position, and biasing means for biasing said retracting means toward said first position, said method comprising:

providing a machine for receiving, orienting, conveying and imprinting an intelligence on a series of pellet-like items, the machine having an endless train;

placing the carrier bar on the endless train;

aligning the mounting aperture with the receiving aperture;

retracting said one of said first and second retaining means away from said elongated shank travel limiting position by moving said retracting means against said biasing means to said second position;

interfitting said elongated movable shank within the aligned mounting aperture and the receiving aperture;

extending said one of said first and second retaining means into said elongated shank travel limiting position by moving said retracting means to said first position;

said first retaining means limiting the travel of said elongated shank through the endless train receiving aperture, said second retaining means limiting the travel of said elongated shank through the carrier bar mounting aperture, the endless train and the carrier bar thus being sandwiched between said first and said second retaining means, the carrier bar being demountably attached to the endless train thereby.

* * * * *